Patented July 7, 1953

2,644,839

UNITED STATES PATENT OFFICE 2,644,839

CATALYTIC ESTERIFICATION PROCESS

Albert C. Zettlemoyer, William C. Walker, and William L. Stump, Bethlehem, Pa., assignors to Food Machinery and Chemical Corporation, a corporation of Delaware No Drawing. Application June 18, 1947, Serial No. 755,484

19 Claims. (Cl. 260—488)

This invention relates to processes for the production of esters from organic acids and alcohols with the aid of solid catalysts and more particularly to a continuous process for producing esters involving passing vapors containing the alcohol and the acid through or in contact with an organic salt of any one of a number of specified metals maintained at an elevated temperature.

Esters of the nature of those produced by the present invention have heretofore been commonly produced in a batch process, as for example by introducing acetic acid and an excess of butanol into a suitable still together with a proper amount of sulphuric acid as a catalyst, and refluxing the resulting mixture until the desired esterification product is obtained in optimum amounts, after which the product is purified by fractionation.

Attempts have been made heretofore to provide a commercial process for the production of ethyl benzoate by esterification of benzoic acid with ethyl alcohol in which certain metal oxides were employed as catalysts, the temperature used being from 370° to 450° C. High yields of the ester were obtained when uneconomical, very high mole ratios of alcohol to acid (amounting to 5 to 1) were used.

Whereas these prior processes produced fairly satisfactory results, the object of the present invention is to provide improved processes of greater simplicity capable of being operated at lower costs. The points of improvement include (1) a lower excess of alcohol and consequent reduction in size of equipment for the same yield, (2) reduction in the amount of fractionation required to obtain a purified product, (3) long life of the catalyst, (4) lower temperatures and (5) particularly high conversions not obtained in prior processes.

Broadly considered the present process involves contacting vapors of the alcohol and vapors containing the acid with an organic salt of a metal higher than hydrogen in the electrochemical series at temperatures which ordinarily need not be much in excess of 250° C.

In a specific embodiment of the process, vapors of n-butyl alcohol and acetic acid in the mole ratio of 2 to 1 are passed through an active bed of zinc or lead acetate supported upon silica gel, said bed being maintained at a temperature of from 250° to 320° C. Under these conditions, the acid is converted to the ester in a 90% yield on a single pass through the bed. The yields can be substantially increased by increasing the mole ratio of alcohol to the acid, but it may not be economical to use a higher ratio. The percentage conversion is very nearly independent of the space velocity between 200 and 800 liters of vapor per liter of catalyst per hour.

The process of the invention contemplates the use of organic acids broadly which are either volatile at the temperature and pressure employed in the reaction or must be producible in vapor form by means of a volatile carrier, preferably the alcohol used in the reaction. The straight chain lower molecular aliphatic acids, such as acetic, propionic and butyric acids and also corresponding branched chain acids are particularly suitable. The invention, however, is also applicable to other acids with various degrees of success including unsaturated mono and polybasic aliphatic acids, aromatic as well as other cyclic mono and polybasic acids, examples being maleic, acrylic and benzoic acids. The anhydrides of the acids may ordinarily be used in place of the acids.

The invention is applicable generally to alcohols, but they too must be volatile at the temperature and pressure used in the reaction. It is particularly applicable to normal primary and branched chain monohydric and polyhydric aliphatic alcohols such as butyl, amyl, isopropyl and isobutyl alcohols, ethylene glycol, and to corresponding secondary alcohols. Unsaturated alcohols such as methallyl alcohol are also contemplated but in some instances the amount of esterification is lessened by the tendency of the alcohol to polymerize such as with furfuryl alcohol.

The catalyst employed in the operation of the present invention, as hereinbefore already indicated, may be defined broadly as an organic salt of a metal higher than hydrogen in the electrochemical series. The organic acid radical of the salt is preferably of the same acid esterified in the reaction with the alcohol and hence may be radicals of the unsubstituted carboxylic acids hereinbefore described. In the practice of the process of the invention by the use of said acid, contamination of the ester product is avoided. The employment in the form of an organic acid salt leads to higher yield, apparently because the alcohol from the vapor phase reacts with the salt to produce an ester and the resulting metal oxide in the surface of the catalyst reacts further with the acid from the vapor phase to regenerate the catalyst. Thus, the acid selected to be used to prepare the catalyst should be the one that is to form a portion of the ester product.

The product is thereby not contaminated and the nature of the catalyst is such as to produce maximum conversion.

As far as has been observed, the operability of the esterification process is not affected by the nature of the acid group of the catalytic salt. The acid group to be used with the metal of the catalyst is selected for its lack of objectionable contaminating properties or its availability at a suitable price.

The fatty acid salts of zinc, lead and ferric iron (which may be reduced to the ferrous state in the reaction chamber) have proven most satisfactory for obtaining high yields of the ester. Good results, however, have been obtained with salts of other metals within the field indicated, such as calcium, magnesium, sodium and chromium.

Although operable as such, the catalysts are most effectively used when the same are supported upon a carrier such as silica gel, activated alumina, activated charcoal and activated magnesia, each of which is an adsorbent material. Catalysts composed of the salt deposited upon silica gel are outstanding in their effectiveness probably due to the combined catalytic effect of the salt and the silica gel itself, this latter material being already known as possessing catalytic activity for certain esterification processes.

One of the features of the present invention is the comparatively low temperature at which the process may be operated to obtain the high yields of esters, such temperatures generally being between 250° and 320° C. In its broader aspects, however, the invention does not exclude somewhat lower or higher temperatures, but if lower temperatures are employed, lower yields will be obtained (other conditions being the same) and at higher temperatures an excessive amount of products other than esters, due to side reactions, may be produced.

In accordance with another feature of the invention, the ratio of alcohol to acid in the reaction need not be as high for comparable yields as in prior catalytic esterification processes. At as low a ratio as 2 to 1 very good yields are generally obtained.

The catalyst may be prepared simply by adsorbing the metal salt on the carrier and then heating the resulting mass over night at a temperature of, for example 250° C. thereby activating the catalyst through removal of water or some phenomena not fully understood. This activation is not one that causes the salt to decompose and form the oxide, for although a small portion of the acid radical may be lost during preparation, radioactive tracer tests conducted upon the activated catalysts prepared for use in the instant process reveal that a substantial proportion of the acid radical always remains on the support.

The catalyst may be prepared specifically by soaking 200 parts of hydrated silica gel in 250 parts of saturated solution of the catalytic material for a suitable period of time as for 30 minutes, after which the excess liquid is decanted off and the treated gel is dried in an oven at 110° C. Hydrated silica gel is employed because of the disintegrating effect of the solution added to dry gel. The hydration of the gel may be accomplished by drawing air saturated with water vapor through commercial silica gel until it has adsorbed sufficient water, 40% by weight usually being sufficient to prevent its breaking up when mixed with the salt solution.

Where the catalyst is an insoluble salt and is to be supported upon a carrier, the preparation of the catalyst may be carried out by adsorbing a soluble salt of a catalytic metal out of solution onto the carrier and then precipitating the metal salt of an appropriate organic acid by soaking this material in a solution of the corresponding organic acid. For example, such result may be accomplished by soaking hydrated silica gel or other carrier in a saturated solution of ferric nitrate for 30 minutes, decanting off the excess liquid and adding a solution of any soluble acetate thereby precipitating ferric acetate on the carrier. The preparation of the catalyst is then completed by washing to remove any excess acetate and drying at 110° C. in an oven. Alternatively, the catalyst may be prepared by adsorbing the catalytic solution on a dry gel instead of upon a hydrated gel, but this procedure is usually not as satisfactory because the gel is broken up in the process.

According to still another procedure, the catalyst may be prepared by absorbing an organic acid metal salt into the hydrogel before drying. For example, the hydrogel which ordinarily is a jelly-like mass is treated with a solution of the salt until it has absorbed the desired amount of salt, such amount depending particularly on the concentration of the initial solution and the time of contact. The treated hydrogel in the form of lumps is then oven-dried at about 110° C. for about twelve hours. A silica gel supported ferric acetate may be effectively produced by this procedure.

The invention is independent of the apparatus employed, for it is essential only that the mixed vapors containing the alcohol and acid be contacted with the catalyst at the required temperature. Good results are obtained by maintaining a bed of the catalyst at the required temperature and passing a pre-heated mixture of the vapors therethrough. By making the bed of suitable depth, the high or quantitative yields of the present invention can ordinarily be obtained in a single passage through the bed. If desired, the process may be made a multi-pass operation.

The reaction may be very satisfactorily carried out in a vertical tube the bottom portion of which is capable of supporting the dried catalyst and the upper portion of which is adapted to hold glass chips and to serve as the vaporizer and pre-heater for the acid and the alcohol. This tube is mounted in two vertically disposed combustion furnaces.

In a typical operation of the described apparatus, 50 mls. of the dried catalyst is placed in the reaction tube and the temperature is raised by means of the combustion furnaces to 250° C. The catalyst is maintained at this temperature for a number of hours or over night during which a slow stream of nitrogen it passed through the catalyst bed.

The catalyst now being activated, a mixture of alcohol and acid, suitably in the mole ratio of 2 to 1, is introduced into the top of the tube at a constant rate and the temperature is adjusted to that desired for the particular esterification reaction to be run. The esterification product and unreacted alcohol leave the organic catalytic material and collect at the bottom of the column. Samples of the product are taken after collection of every 50 mls. The course of the reaction may be followed by making analyses of these samples and ordinarily at least 50 mls. of reactants are necessary before the catalyst will come to equilibrium with the vapors.

The advantages of the process include its continuous operation and more economical performance. The yields are high and there is very little loss due to side reactions, such advantage resulting in part from the ability to employ low temperatures for the esterification reaction.

The life of the catalysts has been found extremely long, for after 13 liters of liquid feed had been passed over one liter of catalyst no indication of decreasing activity had appeared. The yields, furthermore, are obtainable in a single passage of the vapors through the catalyst. The process does not form any appreciable amount of by-products and the unreacted acid and alcohol recovered from the ester products by fractional distillation may be reused in the process. Finally, the apparatus required is comparatively simple and inexpensive.

It should be understood that the present invention is not limited to the specific compounds or procedures herein disclosed but that it extends to all equivalents which will occur to those skilled in the art upon consideration of the terminology and scope of the claims appended hereto.

We claim:

1. In the production of esters from organic acids and alcohols at high temperatures, the improvement which comprises, contacting vapors containing the acid and vapors of the alcohol in the presence of a solid catalytic material composed of an adsorbent carrier containing an organic salt of a heavy metal selected from the group consisting of lead, zinc and ferric iron, with an unsubstituted carboxylic acid.

2. In the catalytic production of esters from organic acids and alcohols at high temperatures, the improvement which comprises conducting mixed vapors containing the acid and alcohol through a reaction zone in contact with a hot, finely divided solid catalytic material composed of an adsorbent carrier containing an organic salt of a heavy metal selected from the group consisting of lead, zinc and ferric iron, with an unsubstituted carboxylic acid.

3. A process for producing organic esters, which comprises passing mixed vapors of an alcohol and an organic acid through a bed, at a temperature of from 250° to 320° C., composed of an adsorbent carrier containing a compound which (1) is an organic salt of a heavy metal selected from the group consisting of lead, zinc and ferric iron, with an unsubstituted carboxylic acid.

4. In the catalytic production of esters from organic acids and alcohols at high temperatures, the improvement which comprises conducting mixed vapors containing the acid and alcohol through a reaction zone in contact with a hot finely divided solid catalytic material composed of an adsorbent carrier containing an organic salt of a heavy metal selected from the group consisting of lead, zinc and ferric iron, with an unsubstituted carboxylic acid, the acid radical of which is that of the same acid used for reacting with the alcohol.

5. In the catalytic production of esters from organic acids and alcohols at high temperatures, the improvement which comprises conducting mixed vapors containing the acid and alcohol into contact with a hot finely divided, silica gel supported catalyst containing an organic salt of a heavy metal selected from the group consisting of lead, zinc and ferric iron, with an unsubstituted carboxylic acid.

6. In the catalytic production of esters from organic acids and alcohols at high temperatures, the improvement which comprises conducting mixed vapors containing the acid and alcohol into contact with a hot finely divided catalyst containing an organic salt of zinc with an unsubstituted carboxylic acid.

7. In the catalytic production of esters from organic acids and alcohols at high temperatures, the improvement which comprises conducting mixed vapors containing the acid and alcohol into contact with a hot finely divided, silica gel supported catalyst containing an organic salt of zinc with an unsubstituted carboxylic acid.

8. In the catalytic production of esters from organic acids and alcohols at high temperatures, the improvement which comprises conducting mixed vapors containing the acid and alcohol into contact with a hot finely divided catalyst containing a zinc salt of an unsubstituted carboxylic acid, the acid radical of which is that of the same acid used for reacting with the alcohol.

9. A process for producing organic esters, which comprises continuously passing mixed vapors of an alcohol and an organic acid in a molar ratio of about 2 to 1, through a bed containing an adsorbent carrier supported organic salt of a heavy metal selected from the group consisting of lead, zinc and ferric iron, with an unsubstituted carboxylic acid at a temperature of from 250° to 320° C.

10. In the catalytic production of esters from organic acids and alcohols at high temperatures, the improvement which comprises conducting mixed vapors of a lower molecular aliphatic acid and an alcohol into contact with a hot, finely divided catalyst composed of an adsorbent carrier containing an organic salt of a heavy metal selected from the group consisting of lead, zinc and ferric iron, with an unsubstituted carboxylic acid.

11. In the catalytic production of esters from organic acids and alcohols, at high temperatures, the improvement which comprises conducting mixed vapors of acetic acid and an alcohol through a porous bed in contact with a hot finely divided catalyst composed of an adsorbent carrier containing an organic salt of a heavy metal selected from the group consisting of lead, zinc and ferric iron, with an unsubstituted carboxylic acid.

12. The process which comprises conducting mixed vapors of acetic acid and an alcohol through a porous bed of a finely divided catalyst composed of an adsorbent carrier containing an organic salt of a heavy metal selected from the group consisting of lead, zinc and ferric iron, with an unsubstituted carboxylic acid, the said bed being maintained at a temperature of from 250° to 320° C.

13. A process for producing organic esters which comprises continuously passing mixed vapors of a lower molecular alcohol and acetic acid through a bed containing a silica gel supported organic salt of a heavy metal selected from the group consisting of lead, zinc and ferric iron, with an unsubstituted carboxylic acid at a temperature of from 250° to 320° C.

14. A catalytic process for the production of butyl acetate which comprises continuously passing mixed vapors containing acetic acid and butyl alcohol through a porous bed of a silica gel supported acetic acid salt of a heavy metal selected from the group consisting of lead, zinc and ferric iron, with an unsubstituted carboxylic acid, the said bed being maintained at a temperature of from 250° to 320° C.

15. A process for producing organic esters which comprises, passing mixed vapors of a polyhydric alcohol and an organic acid into contact with a catalyst composed of an adsorbent carrier containing an organic salt of a heavy metal selected from the group consisting of lead, zinc and ferric iron, with an unsubstituted carboxylic acid whereby the acid is esterified by the alcohol in a catalytic reaction.

16. In the production of esters from organic acids and alcohols at high temperatures, the improvement which comprises, contacting vapors of an organic acid anhydride and vapors of a catalyst composed of an adsorbent carrier containing an alcohol in the presence of an organic salt of a heavy metal selected from the group consisting of lead, zinc and ferric iron, with an unsubstituted carboxylic acid.

17. In the catalytic production of esters from organic acids and alcohols at high temperatures, the improvement which comprises conducting mixed vapors of acetic acid and an alcohol through a hot porous bed of a finely divided catalyst composed of an adsorbent carrier containing lead acetate.

18. In the catalytic production of esters from organic acids and alcohols at high temperatures, the improvement which comprises conducting mixed vapors of acetic acid and an alcohol through a hot porous bed of a finely divided catalyst composed of an adsorbent carrier containing zinc acetate.

19. In the catalytic production of esters from organic acids and alcohols at high temperatures, the improvement which comprises conducting mixed vapors of acetic acid and an alcohol through a hot porous bed of a finely divided catalyst composed of an adsorbent carrier containing ferric acetate.

ALBERT C. ZETTLEMOYER.
WILLIAM C. WALKER.
WILLIAM L. STUMP.

References Cited in the file of this patent

UNITED STATES PATENTS

| Number | Name | Date |
| --- | --- | --- |
| 1,819,818 | Jaeger | Aug. 18, 1931 |
| 1,841,430 | Bollmann | Jan. 19, 1932 |
| 1,881,563 | Held | Oct. 11, 1932 |
| 2,062,918 | Lawson | Dec. 1, 1936 |
| 2,198,172 | McGill | Apr. 23, 1940 |
| 2,401,261 | MacMullen | May 28, 1946 |

FOREIGN PATENTS

| Number | Country | Date |
| --- | --- | --- |
| 131,088 | Great Britain | Aug. 21, 1919 |
| 511,132 | Great Britain | Aug. 8, 1939 |
| 428,307 | Canada | June 19, 1945 |

OTHER REFERENCES

Spangenberg: Chem. Abst., 41, col. 4028 (1947).
Lozovoi: Chem. Abst., vol. 26, p 5251 (1932).
Jatkar: Chem. Abst., vol. 33, p. 3759 (1939).